United States Patent [19]

Kearney et al.

[11] Patent Number: 5,068,595
[45] Date of Patent: Nov. 26, 1991

[54] ADJUSTABLE TEMPERATURE DEPENDENT CURRENT GENERATOR

[75] Inventors: Mark B. Kearney, Kokomo; Dennis M. Koglin, Indianapolis; Jeffrey A. Michael, Bloomington, all of Ind.

[73] Assignee: Delco Electronics Corporation, Kokomo, Ind.

[21] Appl. No.: 585,587

[22] Filed: Sep. 20, 1990

[51] Int. Cl.5 .................................................. G05F 3/16
[52] U.S. Cl. ................................ 323/316; 323/907; 330/288; 330/289; 307/310
[58] Field of Search ............... 307/310; 330/256, 288, 330/257, 289; 323/312, 315, 316, 907

[56] References Cited

U.S. PATENT DOCUMENTS

| | | | |
|---|---|---|---|
| 4,159,449 | 6/1979 | Wittlinger | 330/257 |
| 4,374,335 | 2/1983 | Fukahori et al. | 304/521 |
| 4,455,681 | 6/1984 | Wile | 330/257 |
| 4,473,793 | 9/1984 | Blackmer et al. | 323/311 |
| 4,558,238 | 12/1985 | Yamada et al. | 307/491 |
| 4,593,208 | 6/1986 | Single | 307/296 R |
| 4,604,568 | 8/1986 | Prieto | 323/315 |
| 4,604,586 | 8/1986 | Rinderle | 330/288 |
| 4,614,916 | 9/1986 | Rinderle | 330/289 |
| 4,651,038 | 3/1987 | Cline et al. | 307/591 |
| 4,883,992 | 11/1989 | Koglin et al. | 307/491 |
| 4,947,057 | 8/1990 | Czarnocki et al. | 307/310 |

Primary Examiner—Steven L. Stephan
Assistant Examiner—B. Davidson
Attorney, Agent, or Firm—Anthony Luke Simon

[57] ABSTRACT

An adjustable temperature dependent current generator includes a transconductance current multiplier, a current mirror, two temperature dependent current generating circuits and a current source to generate currents capable of having an adjustable linear relation to temperature.

10 Claims, 3 Drawing Sheets

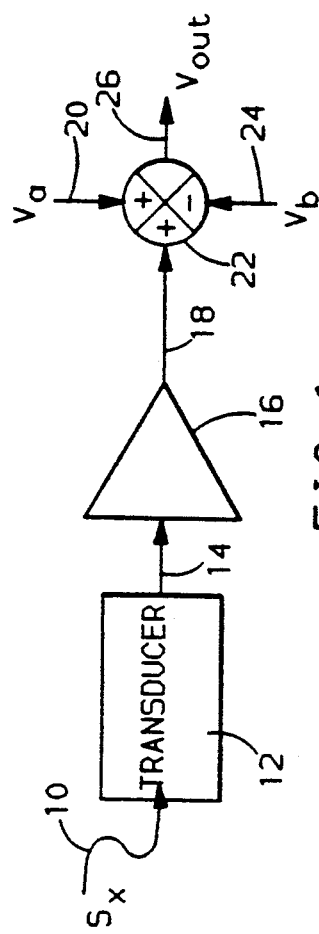
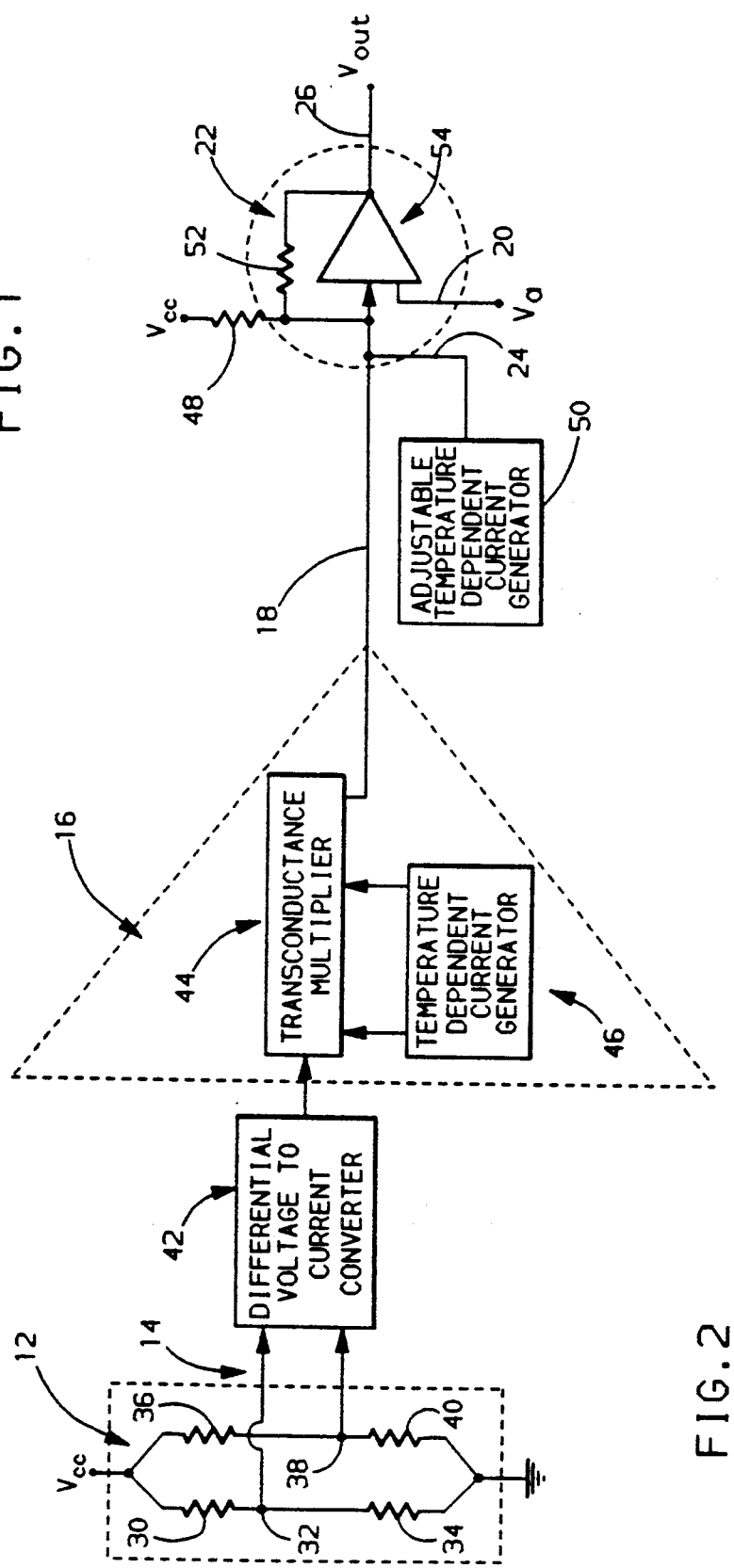
FIG. 1
FIG. 2

ADJUSTABLE TEMPERATURE DEPENDENT CURRENT GENERATOR

This invention relates to circuitry for providing an adjustable temperature dependent current generator useful for canceling out temperature dependent offset currents/voltages.

BACKGROUND OF THE INVENTION

There are many electronic applications where it is desirable to have a circuit which generates a current that varies as a function of temperature, and such circuits exist. However there are other applications where it is desirable for the current generating circuit to be adjustable, to be able to achieve a linear temperature dependence, and to be suitable for use in integrated circuitry.

For example, an instrumentation circuit for an automobile or other vehicle may rely on a transducer input. The transducer supplies a signal to an amplifier circuit in response to an input stimuli. This signal typically has a DC offset voltage, and may vary with temperature as the transducer may have a temperature dependent characteristic. At the output of the amplification circuit is the amplified transducer signal. What is desired is a signal proportional to the input stimuli to the transducer but independent of temperature. This may be accomplished by establishing a gain in the amplifying section that is temperature dependent in such a manner as to compensate for the temperature variation in sensitivity of the transducer. Typically, a summation stage is added for further offsetting the output following amplification such that the output is in a usable voltage range.

If the transducer in the above circuitry is of the piezoresistive type, it may exhibit sensitivities that decrease with increasing temperature in a hyperbolic fashion. In these cases it is desirable to have a corresponding amplifier gain that increases linearly with temperature such that the overall transfer function is temperature independent. However, problems arise when the signal from the transducer includes an offset term, as this term also is multiplied by the temperature dependent gain term. Although the offset of the transducer may typically be temperature independent, when multiplied by the temperature dependent gain of the amplifier, the offset becomes temperature dependent.

One known method of eliminating temperature dependence of the offset term appearing at the output is by employing a means of trimming out the offset in the transducer. In many cases, however, this is not practical because the exact value of the transducer offset may not be known until the amplification and compensation circuitry has been added. In those cases, another method of offset compensation may be desirable.

SUMMARY OF THE PRESENT INVENTION

The present invention is an adjustable temperature dependent current generator and is ideal for providing offset compensation at the output of the amplifying stage of the above described circuitry.

In one embodiment, the invention uses a unique combination of a transconductance current multiplier, a current mirror, two temperature dependent current generating circuits and a current source to generate currents capable of having the relation:

$$I_t = G_c(A-B)/(A+B), \quad (1)$$

where $I_t$ is the output current. $G_c$ is the desired gain of the current generator which can be adjusted to match the temperature dependent gain of the transducer or amplifier which the output current is used to offset. A and B are variables which change with temperature. The circuit can further be adjusted so that:

$$(A-B)/(A+B) = K(T-T_o), \quad (2)$$

where T is the temperature of the circuit, K is a proportionality constant, and $T_o$ is a predetermined temperature which may be an arbitrary test temperature. By achieving the function in equation (2) above, the circuit acquires a linear temperature dependence which can match the temperature dependence of many transducers. One advantage of this invention is that $G_c$ and $T_o$ are adjustable allowing the current generator to match the various characteristics of various possible circuit designs which require a temperature dependent current source. Other embodiments of the invention include other circuit elements but may still achieve the above function.

Structurally, the invention is a current generator comprising a first circuit including a transconductance current multiplier comprising four transistors which in part define four primary current paths through which four currents flow. The first circuit also includes a current mirror comprising two transistors coupled to the transconductance current multiplier. An output current path, through which $I_t$ flows is also part of the first circuit. Two current generating circuits generate two of the primary currents as a function of temperature, achieving the temperature dependence of the current generator. Finally, a temperature independent current control means controls the other two primary currents defining the gain of the current generator.

Various other improvements, modifications, and applications of the present invention are set forth in the detailed description below.

BRIEF DESCRIPTION OF THE DRAWINGS

FIG. 1 is a circuit diagram showing an instrumentation circuit scheme providing temperature compensation in which the present invention may be implemented.

FIG. 2 is a detailed circuit diagram of the instrumentation circuit with temperature compensation showing the adjustable temperature dependent current generator.

DETAILED DESCRIPTION OF THE INVENTION

Figure 3:
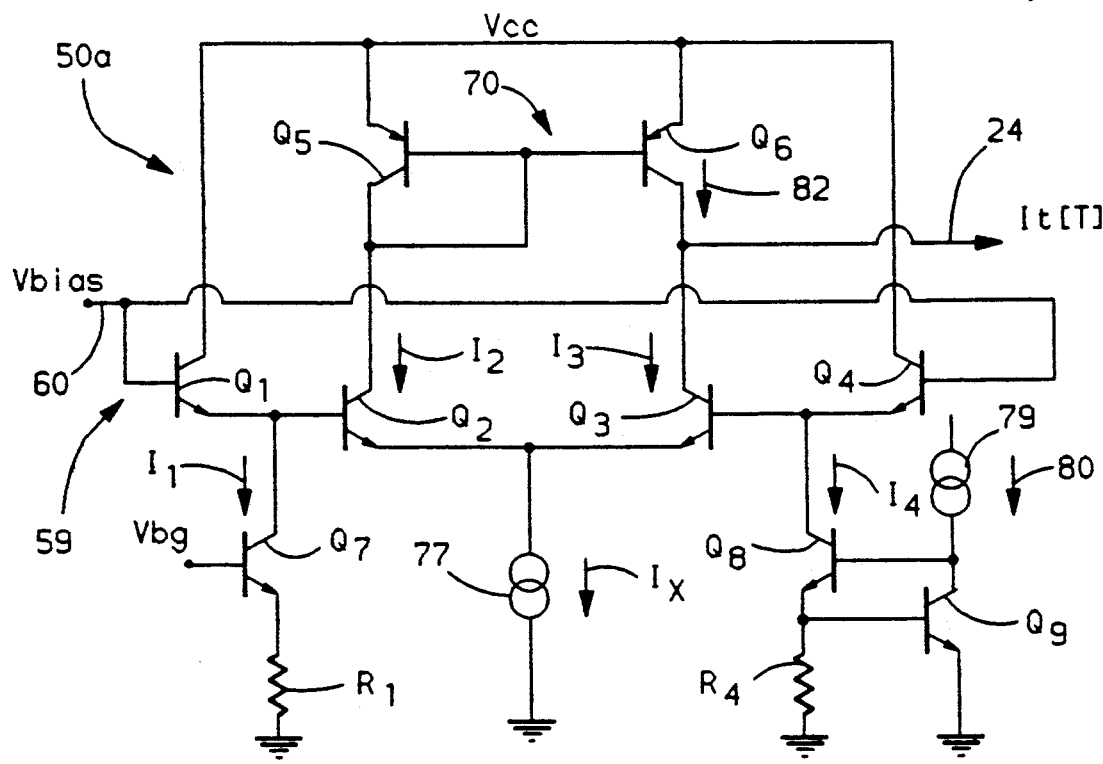
FIG. 3 is a circuit drawing of one implementation of the adjustable temperature dependent current generator, useful for canceling negative offset voltages.

Referring to FIG. 1, an ideal implementation of the present invention is for use with instrumentation circuitry. A parameter to be measured applies a physical stimuli 10 to a transducer 12 which may be a piezoresistive pressure cell as shown in FIG. 2 and which produces an output signal on line 14 which relates to the input stimuli through the function $G_x[T]$, where T is the temperature of the transducer. The transducer output signal on line 14 typically includes an offset voltage which may or may not be temperature dependent. For purposes of this explanation, the offset voltage is not temperature dependent, but as explained below, is input into a temperature dependent amplification stage 16 and, as a result, becomes temperature dependent.

The signal on line 14 is input into a temperature dependent amplifier 16, with a gain of $A_x[T]$. The circuitry is suitable for integration onto a chip and can easily be packaged into a small package with the transducer so that the transducer temperature and the amplification and other circuitry temperatures are substantially identical. The temperature dependence of the gain of amplifier 16 is adjusted to compensate for the temperature dependence of the transducer so that the amplifier output includes the desired relation to the parameter being measured. However, as indicated above, the amplifier also multiplies the transducer offset voltage by a temperature dependent factor. The resultant temperature dependent offset factor is included in the amplifier output at line 18. The present invention is directed to removing the temperature dependent offset factor from the signal in line 18. An example of circuitry for the transducer 12 and the amplifier stage 16 is set forth in U.S. Pat No. 4,883,992, issued on Nov. 28, 1989, assigned to the assignee of the present invention, and herein incorporated into the present specification by reference.

At summing stage 22, the signal in line 18 is added to an offset voltage, $V_a$, in line 20 so that the signal is in a usable voltage range. The present invention provides a temperature dependent offset voltage, $V_b$, in line 24 which compensates for the temperature dependent offset signal in line 18. Assuming that the amplification factor varies with temperature in a substantially linear function, the voltage $V_b$ can be characterized as:

$$V_b = G_c(T - T_o),$$

where $G_c$ is a gain term, T is temperature, and $T_o$ is a predetermined test temperature. This invention allows both $G_c$ and $T_o$ to be adjustable, so it can be used with a variety of different transducer and circuit applications. After temperature dependent offset voltage $V_b$ is added, the resultant signal in line 26 reflects an accurate measure of the parameter independent of temperature. In the detailed circuit explanation below, the voltage signal from the transducer is converted to current signal, amplified, summed with offset currents, and converted back to a voltage signal.

Referring to FIG. 2, the transducer 12 comprises a bridge circuit of piezoresistors 30, 34, 36 and 40 connected so that a supply voltage $V_{cc}$ is applied to one end each of piezoresistors 30 and 36 with ground applied to one end each of piezoresistors 34 and 40. The differential bridge output is taken from the junction 32 of piezoresistors 30 and 34 and the junction 38 of piezoresistors 36 and 40 and applied to the differential inputs of a differential voltage to current converter 42, in which an output current is generated which is proportional to the differential input voltage. This output current is provided to a transconductance multiplier 44, in which it is multiplied by the ratio of a pair of compensation currents generated in temperature dependent current generator 46 to provide a compensated output current. The compensated output current is summed with the temperature dependent offset current, $I_t$ (which is proportional to the desired $V_b$), which is generated by the adjustable temperature dependent current generator 50. The sum current is converted to an output voltage and amplified in an output amplifier summation circuit 22 comprising an operational amplifier 54 with a feedback or output resistor 52, an offset adjustment resistor 48 and a biasing reference voltage $V_a$. The output on line 26 of amplifier summation circuit 22 is the output voltage, $V_{out}$, and is proportional to the input stimuli to the transducer.

The piezoresistive bridge pressure cell is characterized such that there is a single value of the input physical parameter for which the output voltage is temperature independent. For some piezoresistive pressure cells, this value is a null value: that is, the differential voltage output is zero over the entire usable temperature range. Although all such pressure cells have a point at which the output voltage is independent of temperature, this does not automatically occur at a zero voltage level. Without the benefits of the present invention, it is necessary for the correct operation of the instrumentation circuitry that the pressure cell be nulled with the crossing point on the zero voltage axis. As will be explained below, nulling the pressure cell is still desirable with use of the present invention.

The pressure cell can be nulled in an elevated temperature wafer test. While the pressure cells are still in silicon wafer form, the cavities are etched to form diaphragms and the cells are electrostatically bonded to a 60 mil thick glass plate and subjected to output testing at room temperature and an elevated temperature, with trimming adjustment of one of the piezoresistors to produce the nulled pressure cell output. The testing and adjustment must take place after the cells are electrostatically bonded to the glass, since the bonding process changes the cell characteristics with respect to this variable. The production of a perfectly nulled pressure cell eliminates the requirement of any elevated temperature functional tests of the instrumentation circuitry. However, as it turns out, obtaining perfectly nulled pressure cells is not often practically possible. The result is that there is some offset voltage of the transducer at which the output is temperature independent. This invention compensates for that offset voltage. Although, with the present invention, attempted nullification of the piezoresistive bridge is not required, it is still desirable because it reduces the amount of offset voltage for which the circuit of this invention must compensate.

Detailed descriptions of the differential voltage to current converter 42, transconductance multiplier 44, and differential current generator 46 are all explained in detail in U.S. Pat. No. 4,883,992 and will not be further explained herein.

Referring to FIG. 3, the detailed schematic of adjustable temperature dependent current generator 50a compensates for negative offset voltages in the transducer 12 (FIGS. 1 and 2). Preferably, this circuit will be integrated into a single chip with the voltage to current conversion, amplification, and summation circuits in FIG. 2. For the circuit in FIG. 3, the transistors all have equivalent emitter areas and are ideally equivalent. Transistors $Q_1$, $Q_2$, $Q_3$, and $Q_4$ comprise a transconductance current multiplier 59, biased through line 60 to independent voltage source $V_{bias}$. Transistors $Q_5$ and $Q_6$ comprise a current mirror circuit 70 which is coupled to transistors $Q_2$ and $Q_3$ as shown.

The transistors $Q_1$, $Q_2$, $Q_3$, and $Q_4$ are all part of current paths through which currents $I_1$, $I_2$, $I_3$, and $I_4$ flow. Current 82 is identical to current $I_2$ because of the current mirror circuit 70. The output current, $I_t[T]$, on line 24 equals the difference of currents $I_2$ and $I_3$. The sum of currents $I_2$ and $I_3$ equals current $I_x$, which is controlled by current source 77. The transconductance current multiplier is a current multiplying circuit having the relation:

$$I_1 I_2 = I_3 I_4.$$

The sum of the base-emitter voltages of transistors $Q_1$ and $Q_2$ equals that of transistors $Q_3$ and $Q_4$. Since the base-emitter voltage is essentially a log function of collector current in the active linear region, the product of the collector currents in transistors $Q_1$ and $Q_2$ equals that of transistors $Q_3$ and $Q_4$. From these relations it can be shown that the output current $I_t$ can be defined:

$$I_t = I_x(I_4 - I_1)/(I_1 + I_4).$$

Since current source 77 is temperature independent, it can be properly adjusted to achieve the desired gain term $G_c$ for the circuit.

Current $I_1$ is controlled in a temperature dependent manner through the first current generating circuit comprising transistor $Q_7$ and resistor $R_1$. The current flowing through the base of transistor $Q_2$ is negligible, so virtually all of current $I_1$ flows though transistor $Q_7$ and resistor $R_1$. Transistor $Q_7$ is forward biased by a temperature independent constant voltage source, supplying voltage $V_{bg}$. In this circuit, the highly linear relationship of the forward base-emitter voltage ($V_{be}$) over temperature of transistor $Q_7$ is used to generate the temperature dependence of current $I_1$. Since the voltage $V_{bg}$ is constant, the voltage between the base of transistor $Q_7$ and the ground connection of resistor $R_1$ is constant. As the base-emitter voltage of transistor $Q_7$ changes with temperature, the voltage across resistor $R_1$ changes, altering the current through resistor $R_1$, which is current $I_1$. In this manner, current $I_1$ achieves a linear temperature dependency.

The second current generating circuit, comprising current source 79, transistors $Q_8$ and $Q_9$, and resistor $R_4$, provides the linear temperature dependence of current $I_4$. Current source 79 provides current 80 which forward biases transistor $Q_8$. Resistor $R_4$ is connected across the base and emitter of transistor $Q_9$. Current $I_4$ flows through transistor $Q_4$ down through transistor $Q_8$ and resistor $R_4$. The base-emitter voltage of transistor $Q_9$ has the same temperature dependency as the base-emitter voltage of transistor $Q_7$. As the base-emitter voltage of transistor $Q_9$ linearly changes with temperature, the voltage across resistor $R_4$ changes, altering the current, $I_4$, through resistor $R_4$. In this manner current $I_4$ achieves a temperature dependency, opposite that of current $I_1$.

When the current $I_t[T]$ is desired to have a linear temperature dependency, currents $I_1$ and $I_4$ must relate such that:

$$(I_4 - I_1)/(I_1 + I_4) = K(T - T_o),$$

where K is a proportionality constant and $T_o$ is a test temperature. To achieve the above linear relationship, ideally transistors $Q_1$, $Q_2$, $Q_3$, $Q_4$, $Q_7$, $Q_8$, and $Q_9$ are identical, transistors $Q_5$ and $Q_6$ are identical, and resistors $R_1$ and $R_4$ are identical. $V_{bg}$ is set to twice $V_{beo}$, which is the base-emitter voltage $V_{be}$ of the transistors at the test temperature $T_o$. In practice, there will be mismatches between the transistors and this can cause an error term in the relation between $I_1$ and $I_4$. To correct the error, resistors $R_1$ and $R_4$ can be adjusted to negate the overall mismatch of the transistors. To accomplish this, the system is first taken to the desired test temperature, $T_o$, where voltage source $V_{bg}$ is adjusted so that $V_{bg} = 2V_{beo}$. While monitoring $I_t[T]$, either $R_4$ or $R_1$ is adjusted such that $It[T=T_o]$ is forced to zero. This assures that the desired relation:

$$I_t[T] = G_c(T - T_o)$$

can be achieved, because the sum of $I_1 + I_4$ is temperature independent. $G_c$ is set by adjustment of current source 77, which controls $I_x$.

Figure 4:
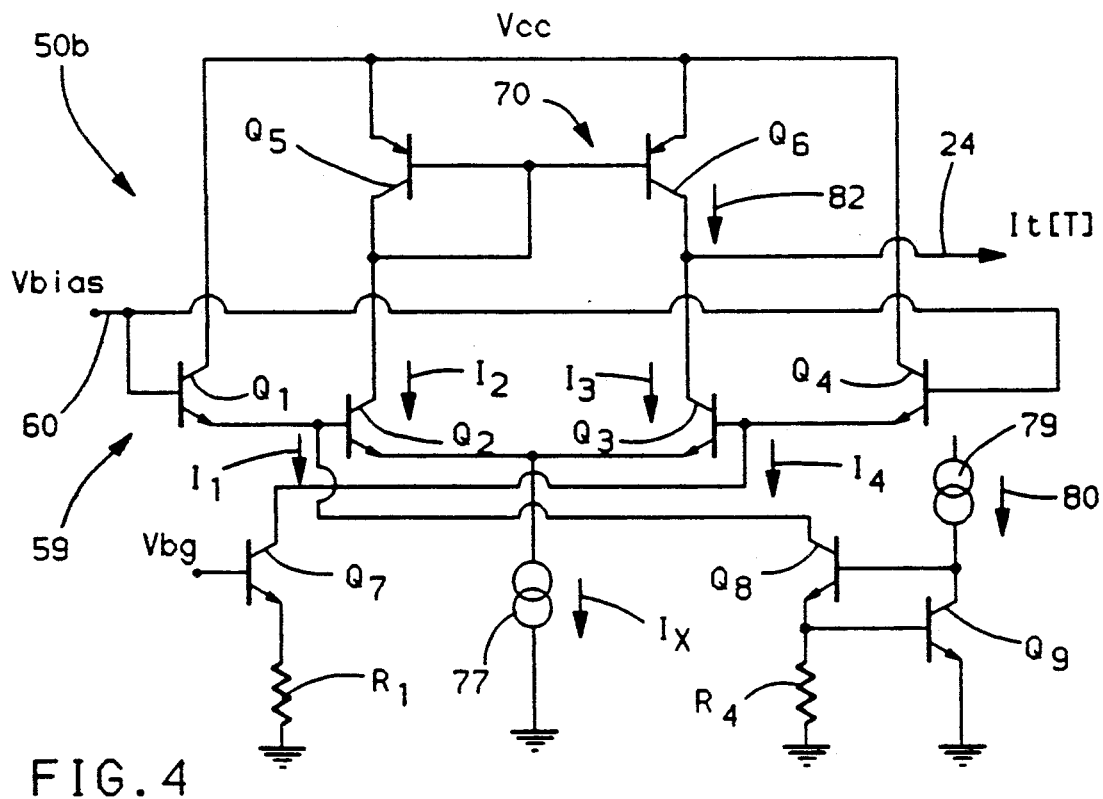
FIG. 4 is a circuit drawing of a second implementation of the adjustable temperature dependent current generator, useful for canceling positive offset voltages.

The circuit in FIG. 3 is desirable when the offset voltage of the transducer is negative. When it is known that the offset voltage of the transducer is positive, the circuit in FIG. 4 is preferred. The temperature dependent current generator 50b in FIG. 4 is identical to the current generator in FIG. 3 except that the collector of transistor $Q_7$ is connected to the emitter of transistor $Q_4$ and the collector of transistor $Q_8$ is connected to the emitter of transistor $Q_1$. Because of this connection, the output current of $I_t$ is now defined:

$$I_t = -I_x(I_4 - I_1)/(I_1 + I_4).$$

As can be seen, using the circuit in FIG. 4, $I_t$ can be used to compensate for positive offset voltages.

Figure 5:
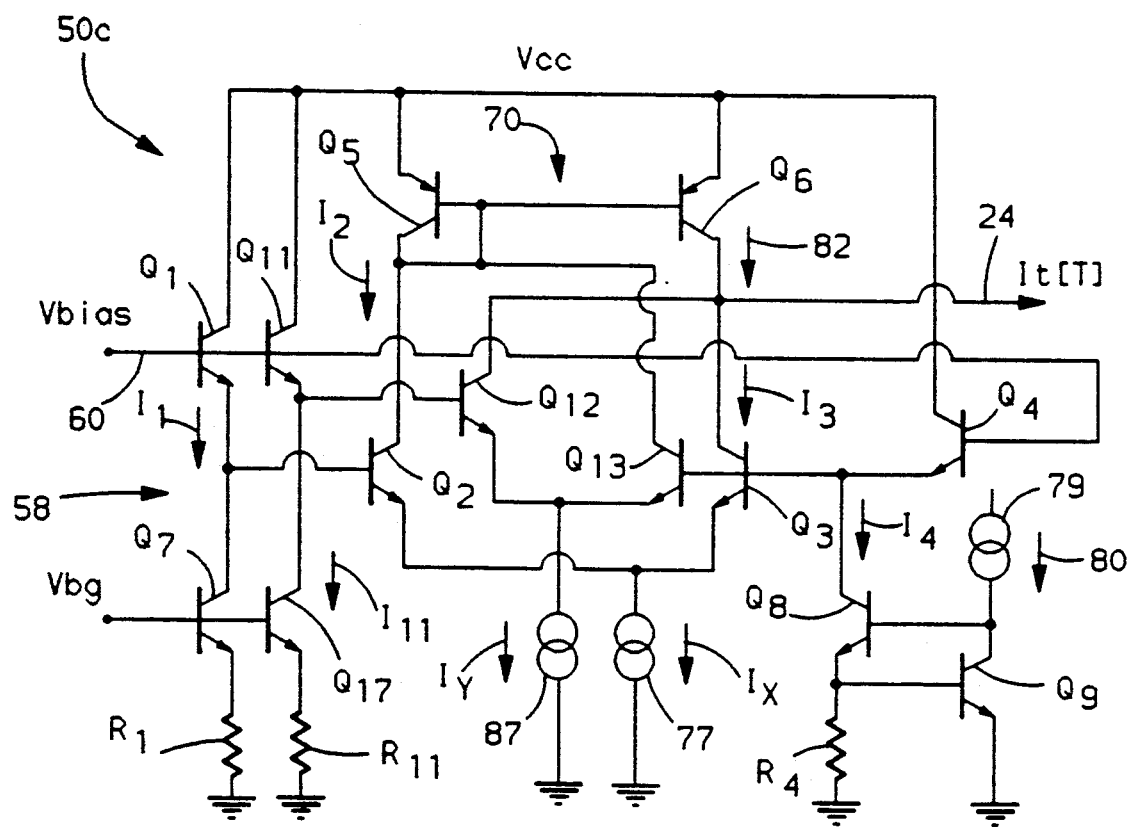
FIG. 5 is a circuit drawing for a third implementation of the adjustable temperature dependent current generator, useful for canceling either positive or negative offset voltages.

The circuit in FIG. 5 is desirable for compensating for both positive and negative offset voltages. Referring to FIG. 5, the temperature dependent offset current generator 50c includes a four quadrant transconductance current multiplier 58 comprising transistors $Q_1$, $Q_2$, $Q_3$, $Q_4$, $Q_{11}$, $Q_{12}$, and $Q_{13}$. Transistor $Q_{11}$ is part of a fifth current path and is connected to the base of transistor $Q_1$ as shown. The emitter of transistor $Q_{11}$ is connected to a current generating circuit comprising transistor $Q_{17}$ and resistor $R_{11}$ which are identical to transistor $Q_7$ and resistor $R_1$, respectively. With this circuit arrangement, the current through transistor $Q_{11}$, current $I_{11}$, is identical to the current through transistor $Q_1$.

Transistors $Q_{12}$ and $Q_{13}$ are coupled to the current mirror 70 and a temperature independent current source 87 as shown. The current source 87 controls the current $I_y$, which is the sum of the currents through the transistors $Q_{12}$ and $Q_{13}$. With this circuit arrangement, the output current $I_t$ can be described:

$$I_t = (I_x - I_y)(I_4 - I_1)/(I_1 + I_4).$$

As can be seen, by adjusting $I_x$ and $I_y$, the circuit can produce both positive and negative temperature dependent currents allowing it to compensate for both positive and negative offset voltages when used with the circuit in FIG. 2. Additionally, if resistor $R_1$ equals resistor $R_{11}$, $V_{bg}$ equals 2 $V_{beo}$, and resistor $R_4$ is adjusted so that $It[T=T_o]$ equals zero, then the circuit will be temperature dependent in proportion to $(T - T_o)$, so that:

$$I_t[T] = G_c(T - T_o).$$

The circuit of the invention is not limited to the above described illustration and is not limited to the use of compensation for offset voltages. Rather, the present invention can be used anywhere an adjustable temperature dependent current source is desirable, including cameras, timepieces, and other instruments subject to varying temperature conditions. Furthermore, other improvements and modifications to the present invention may occur to those skilled in the art and will fall within the scope of this invention which is defined below.

The embodiments of the invention in which an exclusive property or privilege is claimed are defined as follows:

1. A current generator for supplying an output current with adjustable temperature dependence, comprising:

a first circuit including (1) a transconductance current multiplier comprising four transistors, $Q_1$, $Q_2$, $Q_3$, and $Q_4$, the four transistors in part defining four primary current paths through with four primary currents, $I_1$, $I_2$, $I_3$, and $I_4$, flow (2) a current mirror comprising transistors $Q_5$ and $Q_6$ coupled to the transconductance current multiplier, transistor $Q_5$ connected to transistor $Q_2$ and transistor $Q_6$ connector to transistor $Q_3$, and (3) an output current path, coupled to the connection of transistor $Q_3$ to transistor $Q_6$, through which the output current, $I_t$, flows, the output current substantially bearing a relation to the two primary currents $I_1$ and $I_4$ such that:

$$I_t = G_c(I_4 - I_1)/(I_1 + I_4),$$

where $G_c$ is a constant;

first means for generating current $I_1$ as a function of temperature;

second means for generating current $I_4$ as a function of temperature, wherein the first and second current generating means produce equal and opposite changes in $I_1$ and $I_4$ such that currents $I_1$ and $I_4$ bear a relationship to temperature of:

$$(I_4 - I_1)/(I_1 + I_4) = K(T - T_o),$$

where, K is a constant, $T_o$ is an arbitrary temperature and T is a measure of the current generator temperature; and means for controlling currents $I_2$ and $I_3$ independent of temperature such that $G_c$ is adjusted independent of temperature whereby the current generator has an adjustable gain, $G_c$.

2. A current generator for supplying an output current with adjustable temperature dependence, comprising:

a first circuit including (1) a transconductance current multiplier comprising four transistors, $Q_1$, $Q_2$, $Q_3$, and $Q_4$, the four transistors in part defining four primary current paths through with four primary currents, $I_1$, $I_2$, $I_3$, and $I_4$, flow (2) a current mirror comprising transistors $Q_5$ and $Q_6$ coupled to the transconductance current multiplier, transistor $Q_5$ connected to transistor $Q_2$ and transistor $Q_6$ connector to transistor $Q_3$, and (3) an output current path, coupled to the connection of transistor $Q_3$ to transistor $Q_6$, through which the output current, $I_t$, flows, the output current substantially bearing a relation to the two primary currents $I_1$ and $I_4$ such that:

$$I_t = G_c(I_4 - I_1)/(I_1 + I_4),$$

where $G_c$ is a constant;

first means for generating current $I_1$ as a function of temperature, the first current generating means including a second circuit comprising part of the current path through with $I_1$ flows including a transistor $Q_7$ with a base, an emitter, and a base-emitter voltage, a temperature independent voltage source supplying a voltage $V_{bg}$ to the base of transistor $Q_7$, and a resistor $R_1$, with a voltage, connected between the emitter of transistor $Q_7$ and a ground, the base-emitter voltage of transistor $Q_7$ changing in relation to temperature thereby altering the voltage across $R_1$ and current $I_1$ in relation to temperature;

second means for generating current $I_4$ as a function of temperature, the second current generating means including a third circuit comprising part of the current path through which $I_4$ flows including two transistors, $Q_8$ and $Q_9$, $Q_9$ having a base and a base-emitter voltage, a temperature independent current source forward biasing transistor $Q_8$, and a resistor $R_4$, with a voltage, connected between the base of transistor $Q_9$ and ground, the base-emitter voltage of transistor $Q_9$ changing in relation to temperature thereby altering the voltage across $R_4$ and current $I_4$ in relation to temperature; and means for controlling currents $I_2$ and $I_3$ independent of temperature such that $G_c$ is adjusted independent of temperature whereby the current generator has an adjustable gain, $G_c$.

3. The current generator in claim 2 wherein (1) transistors $Q_7$ and $Q_9$ are substantially identical, (2) resistors $R_1$ and $R_4$ are substantially identical, and (3) voltage $V_{bg}$ is substantially twice the base-emitter voltages of $Q_7$ and $Q_9$ at a predetermined temperature, $T_o$, such that, as temperature, T, changes, the relation of $I_1$ and $I_4$ changes in the manner:

$$(I_4 - I_1)/(I_1 + I_4) = K(T - T_o),$$

where K is a constant.

4. A current generator for supplying an output current with adjustable temperature dependence, comprising:

a first circuit including (1) a transconductance current multiplier comprising four transistors, $Q_1$, $Q_2$, $Q_3$, and $Q_4$, the four transistors in part defining four primary current paths through with four primary currents, $I_1$, $I_2$, $I_3$, and $I_4$, flow (2) a current mirror comprising transistors $Q_5$ and $Q_6$ coupled to the transconductance current multiplier, transistor $Q_5$ connected to transistor $Q_2$ and transistor $Q_6$ connector to transistor $Q_3$, and (3) an output current path, coupled to the connection of transistor $Q_3$ to transistor $Q_6$, through which the output current, $I_t$, flows, the output current substantially bearing a relation to the two primary currents $I_1$ and $I_4$ such that:

$$I_t = G_c(I_4 - I_1)/(I_1 + I_4),$$

where $G_c$ is a constant;

first means for generating current $I_1$ as a function of temperature;

second means for generating current $I_4$ as a function of temperature; and means for controlling currents $I_2$ and $I_3$ independent of temperature, including an adjustable temperature independent constant current source, coupled between transistors $Q_2$ and $Q_3$ and ground, and supplying a current, $I_x$, substantially equal to the sum of currents $I_2$ and $I_3$, where current $I_x$ is substantially directly proportional to $G_c$, such that $G_c$ is adjustable independent of temperature whereby the current generator has an adjustable gain, $G_c$.

5. A current generator for supplying an output current with adjustable temperature dependence, comprising:

a first circuit including (1) a transconductance current multiplier comprising four transistors, $Q_1$, $Q_2$, $Q_3$, and $Q_4$, the four transistors in part defining four primary current paths through with four primary currents, $I_1$, $I_2$, $I_3$, and $I_4$, flow (2) a current mirror comprising transistors $Q_5$ and $Q_6$ coupled to the transconductance current multiplier, transistor $Q_5$ connected to transistor $Q_2$ and transistor $Q_6$ connector to transistor $Q_3$, and (3) an output current path, coupled to the connection of transistor $Q_3$ to transistor $Q_6$, through which the output current, $I_t$, flows, the output current substantially bearing a relation to the two primary currents $I_1$ and $I_4$ such that:

$$I_t = G_c(I_4 - I_1)/(I_1 + I_4),$$

where $G_c$ is a constant;

first means for generating current $I_1$ as a function of temperature, including a second circuit comprising part of the current path through with $I_4$ flows including a transistor $Q_7$ with a base, and emitter, and a base-emitter voltage, a temperature independent voltage source supplying a voltage $V_{bg}$ to the base of transistor $Q_7$, and a resistor $R_1$, with a voltage, connected between the emitter of transistor $Q_7$ and a ground, the base-emitter voltage of transistor $Q_7$ changing as a function of temperature thereby altering the voltage across $R_1$ and current $I_4$ in response to temperature;

second means for generating current $I_4$ as a function of temperature, including a third circuit comprising part of the current path through which $I_1$ flows including two transistors $Q_8$ and $Q_9$, $Q_9$ having a base and a base-emitter voltage, a temperature independent current source forward biasing transistor $Q_8$, and a resistor $R_4$, with a voltage, connected between the base of transistor $Q_9$ and ground, the base-emitter voltage of transistor $Q_9$ changing as a function of temperature thereby altering the voltage across $R_4$ and current $I_4$ in response to temperature; and means for controlling currents $I_2$ and $I_3$ independent of temperature such that $G_c$ is adjusted independent of temperature whereby the current generator has an adjustable gain, $G_c$.

6. A current generator for supplying an output current with adjustable temperature dependence, comprising:

a first circuit including (1) a transconductance current multiplier comprising four transistors, $Q_1$, $Q_2$, $Q_3$, and $Q_4$, the four transistors in part defining four primary current paths through with four primary currents, $I_1$, $I_2$, $I_3$, and $I_4$, flow (2) a current mirror comprising transistors $Q_5$ and $Q_6$ coupled to the transconductance current multiplier, transistor $Q_5$ connected to transistor $Q_2$ and transistor $Q_6$ connector to transistor $Q_3$, and (3) an output current path, coupled to the connection of transistor $Q_3$ to transistor $Q_6$, through which the output current, $I_t$, flows, the output current substantially bearing a relation to the two primary currents $I_1$ and $I_4$ such that:

$$I_t = G_c(I_4 - I_1)/(I_1 + I_4),$$

where $G_c$ is a constant, the transconductance current multiplier additionally comprising three transistors, $Q_{11}$, $Q_{12}$, and $Q_{13}$, wherein the transconductance current multiplier is a four quadrant transconductance current multiplier, the tree transistors in part defining three additional current paths through which three additional currents, $I_{11}$, $I_{12}$, $I_{13}$, flow, the current $I_{11}$ being substantially equal to current $I_1$, first means for generating current $I_1$ as a function of temperature;

second means for generating current $I_4$ as a function of temperature;

means for controlling currents $I_2$ and $I_3$ independent of temperature and for controlling currents $I_{12}$ and $I_{13}$ independent of temperature and independent of currents $I_2$ and $I_3$, such that $G_c$ is adjustable independent of temperature whereby the current generator has an adjustable gain, $G_c$; and third means for generating current $I_{11}$ as a function of temperature.

7. The current generator in claim 6 wherein the first, second and third current generating means produce substantially equal and opposite changes in currents $I_1$ and $I_4$ and substantially equal changes in currents $I_1$ and $I_{11}$ such that currents $I_1$ and $I_4$ bear a relationship to temperature of:

$$(I_4 - I_1)/(I_1 + I_4) = K(T - T_o),$$

where $K$ is a constant, $T_o$ is a predetermined temperature and $T$ is a measure of the current generator temperature.

8. The current generator in claim 6 wherein:

the first and third current generating means include a second circuit comprising part of the current paths through which currents $I_1$ and $I_{11}$ flow including two transistors $Q_7$ and $Q_{17}$, each with a base, an emitter, and a base-emitter voltage, a temperature independent voltage source supplying a voltage $V_{bg}$ to the base of transistors $Q_7$ and $Q_{17}$, and two resistors $R_1$ and $R_{11}$, with voltages, $R_1$ connected between the emitter of $Q_7$ and a ground and $R_{11}$ connected between the emitter of $Q_{17}$ and ground, the base-emitter voltages of transistors $Q_7$ and $Q_{17}$ changing in relation to temperature thereby altering the voltages across $R_1$ and $R_{11}$ and current $I_1$ and $I_{11}$ in relation to temperature; and the second current generating means includes a third circuit comprising part of the current path through which $I_4$ flows including two transistors, $Q_8$ and $Q_9$, $Q_9$ having a base and a base-emitter voltage, a temperature independent current source forward biasing transistor $Q_8$, and a resistor $R_4$, with a voltage, connected between the base of transistor $Q_9$ and ground, the base-emitter voltage of transistor $Q_9$ changing in relation to temperature thereby altering the voltage across $R_4$ and current $I_4$ in relation to temperature.

9. The current generator in claim 8 wherein (1) transistors $Q_7$, $Q_{17}$ and $Q_9$ are substantially identical, (2) resistors $R_1$, $R_{11}$ and $R_4$ are substantially identical, and (3) voltage $V_{bg}$ equals twice the base-emitter voltages of $Q_7$, $Q_{17}$ and $Q_9$ at a predetermined temperature, $T_o$, such that, as temperature, T, changes, the relation of $I_1$ and $I_4$ changes in the manner:

$$(I_4-I_1)/(I_1+I_4)=K(T-T_o),$$

where K is a constant.

10. The current generator in claim 6 wherein the current controlling means includes first and second adjustable temperature independent constant current sources, the first current source, coupled between transistors $Q_2$ and $Q_3$ and ground, supplying a current, $I_x$, substantially equal to the sum of currents $I_2$ and $I_3$, the second current source, coupled between transistors $Q_{12}$ and $Q_{13}$ and ground, supplying a current, $I_y$, substantially equal to the sum of currents $I_{12}$ and $I_{13}$, where a current difference, $(I_x-I_y)$, is substantially directly proportional to $G_c$.

* * * * *